United States Patent [19]

Marwick

[11] 4,121,969
[45] Oct. 24, 1978

[54] CONTAINED FISSIONLY VAPORIZED IMPLODED FISSION EXPLOSIVE BREEDER REACTOR

[76] Inventor: Edward F. Marwick, 5149 W. Morse, Skokie, Ill. 60076

[21] Appl. No.: 722,728

[22] Filed: Sep. 13, 1976

Related U.S. Application Data

[63] Continuation-in-part of Ser. No. 355,016, Apr. 27, 1973.

[51] Int. Cl.² .............................................. G21C 1/02
[52] U.S. Cl. .......................................... 176/18; 176/9; 176/17; 176/39; 176/DIG. 1
[58] Field of Search ................... 176/1, 9, 39, DIG. 1, 176/17, 18; 102/21

[56] References Cited

U.S. PATENT DOCUMENTS

| | | | |
|---|---|---|---|
| 3,107,211 | 10/1963 | Mallinckrodt | 176/1 |
| 3,134,437 | 5/1964 | Karpovich | 102/21 |
| 3,303,097 | 2/1967 | Mallinckrodt | 176/1 |
| 3,346,458 | 10/1967 | Schmidt | 176/1 |
| 3,385,759 | 5/1968 | Bettis et al. | 176/DIG. 1 |
| 3,489,645 | 1/1970 | Daiber et al. | 176/1 |
| 3,763,781 | 10/1973 | Halley, Jr. | 102/21 |
| 3,921,405 | 11/1975 | Rosciszewski | 176/9 |

FOREIGN PATENT DOCUMENTS

1,126,037  3/1962  Fed. Rep. of Germany .... 176/DIG. 1
825,026  12/1959  United Kingdom ........................ 176/1

OTHER PUBLICATIONS

The Illustrated Science and Invention Encyclopedia, vol. 1, pp. 2–6, (1974), H. S. Stuttman Co., N.Y., N.Y.
Exploding Reactors for Power, by Edward Marwick, (1/27/73), Julia Marwick Books, pp. 1–40.

Primary Examiner—Verlin R. Pendegrass
Assistant Examiner—S. A. Cangialosi
Attorney, Agent, or Firm—Joel D. Talcott

[57] ABSTRACT

A nuclear reactor system which produces useful thermal power and breeds fissile isotopes wherein large spherical complex slugs containing fissile and fertile isotopes as well as vaporizing and tamping materials are exploded seriatim in a large containing chamber having walls protected from the effects of the explosion by about two thousand tons of slurry of fissile and fertile isotopes in molten alkali metal. The slug which is slightly sub-critical prior to its entry into the centroid portion of the chamber, then becomes slightly more than prompt-critical because of the near proximity of neutron-reflecting atoms and of fissioning atoms within the slurry. The slurry is heated by explosion of the slugs and serves as a working fluid for extraction of heat energy from the reactor. Explosive debris is precipitated from the slurry and used for the fabrication of new slugs.

26 Claims, 4 Drawing Figures

CONTAINED FISSIONLY VAPORIZED IMPLODED FISSION EXPLOSIVE BREEDER REACTOR

This is a continuation-in-part of U.S. Pat. application Ser. No. 355,016 filed Apr. 27, 1973.

This invention pertains to a nuclear reactor system wherein large spherical complex slugs are exploded seriatim in a large containing chamber which results in the production of useful thermal power and in the breeding of fissile isotopes. About two thousand tons of spray containing sodium with actinides constituted in slurry form protects the walls of the chamber from the effects of the fission explosion. The spray is collected as a heated slurry and serves as a working fluid as well as a means of collecting the debris of the explosion. The materials withdrawn from the slurry are used in the fabrication of new slugs.

The above-identified application, Ser. No. 355,016, discloses the explosion of nuclear explosives devices within a large chamber which is maintained at a very low atmospheric pressure. At the moment of explosion the chamber is filled with copious quantities of spray from a great number of ejectors. Such spray attenuates the shock-blast of the explosion and useful energy is obtained by collecting the now heated spray liquid in a pool at the bottom of the explosion chamber and by passing the liquid through heat exchangers which are outside the explosion chamber. Additionally, useful materials not used in the explosion may be reclaimed for reuse along with plutonium which is produced.

Previous designs of exploding reactors utilizing alkali metal actinide slurries are disclosed in U.S. Pat. Application Ser. No. 544,178 of Edward F. Marwick and Nis H. Juhl, filed Jan. 27, 1975, and my U.S. Pat. application Ser. No. 655.062 filed Feb. 4, 1976.

In accordance with this invention, a complex single slug having a sub-critical configuration is dropped into a chamber and a spray pattern is formed about it such that the combined configuration of the single slug and the actinide-containing slurry-spray is slightly more than prompt-critical. The centroid shell of mostly fissile actinides is quickly heated up and is converted to its liquid phase. The thin middle shell of solid sodium with actinides and cryogenic argon is so heated that a high pressure of sodium vapor and argon gas is contained by the thick outer shells of actinides and solid sodium. This high pressure vapor and gas causes the implosion of the liquified actinide shell into the centroid void. Such implosion momentarily causes a great increase in the super-criticality of the whole configuration and hence a greater explosion occurs.

The system and method of this invention provide an inexpensive (in per thermal energy unit produced) nuclear reactor system which also has a relatively short time for doubling its inventory of fissile material. Additional advantages are found in the use of a single projected slug for each explosion as well as the lack of any need for any complex accelerating means. Also the practice of this invention does not require any fine timing or aiming.

These and other advantages of this invention will be more readily apparent when the following Specification is read in conjunction with the appended drawings, wherein.

Figure 1:
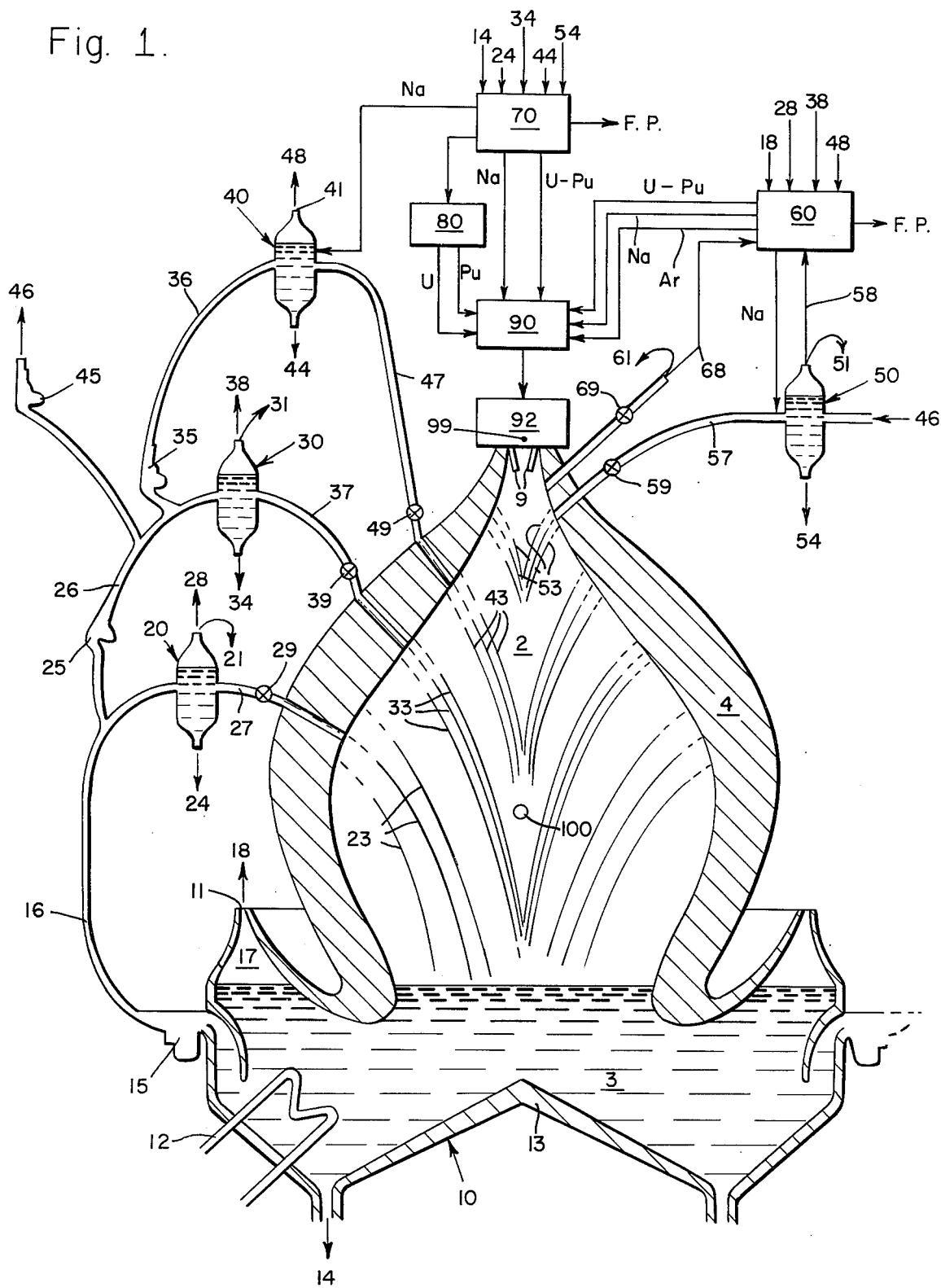
FIG. 1 is a somewhat scehmatic cross-sectional view of an explosion chamber of this reactor system with significant portions of the reactor system schematically presented.

Referring now to the drawings, FIG. 1 illustrates the reactor system of this invention wherein nuclear explosions are contained within a chamber 2 which preferably is generally pear-shaped. At the instant of explosion a blanketed nuclear explosive 100 is about 12 meters from side walls 4 of the chamber 2, about 10 meters from the surface of a pool 3 of molten slurry at the bottom of the chamber 2, and about 18 meters from closed trapdoors 9 at the top of the chamber. The walls 4 may be as thick as 5 meters to withstand the contained explosions, particularly where a plurality of conduits 27, 37, 47, 57, extend through the walls. In portions of walls which undergo less shock a thickness of only a meter may be sufficient. This may be so in the upper portion of the chamber near the trap doors 9.

While materials such as a continuously cast steel alloy may be used to form the walls 4, the metallurgy of or of the construction techniques used in the fabrication of such walls are readily understood by those skilled in the construction arts and will not be disclosed in detail herein.

The trap doors 9 need to be strong enough to withstand the effects of the nuclear explosions and may be of any desired design which permits an opening of slightly more than a half-meter in diameter so that the nuclear explosive 100 can fall from dropping means 92 into the chamber 2 when the trap doors 9 are opened. It may be desireable to add some neutron absorbing material such as boron to the steel used in the construction of the trap doors so that the trap doors will not be too efficient a neutron reflector while the nuclear explosive 100 is passing through them.

Near the trap doors 9 is preferably a conduit 68. Alternately, a plurality of such conduits could be provided. Through such conduits, any vapors or gases such as argon within the chamber 2 will be withdrawn into a vapor processing means 60. Passage of these gases will be controlled by valve 69. At the instant of explosion the vapor pressure within the chamber is very low, generally less than a millimeter of mercury. Although sodium has a vapor pressure of 1 mm at 439° C. and the temperature of the surface of the pool 3 may be greater than than, the vapor pressure of sodium toward the upper portion of the chamber will be very low since there will be condensation upon the spray of sodium slurry which is injected into the chamber prior to the explosion. Some of this very low pressure would be due to fission product decay isotopes such as those of krypton and xenon. Their precursors of bromine and iodine may not have precipitated down or the gases themselves may not have been withdrawn by means which will be subsequently disclosed.

At the instant of explosion about 2,000 tons of molten sodium slurry will be in the chamber in such a pattern that the walls of the chamber, the trap doors, and the pool 3, are substantially protected from the effects of the explosion. Four systems of sprays may be used to obtain this objective; a plurality of sprays such as is shown as spray 23 are projected through the conduits 27 controlled by valves 29, a plurality of sprays such as is shown as spray 33 are projected through conduits 37 and controlled by valves 39, a plurality of sprays such as 43 are projected through conduits 47 and controlled by valves 49 while a plurality of sprays such as 53 are projected through conduits 57 and controlled by valves 59.

These sprays absorb most of the energy of the explosion, attenuate most of the shock-blast effects of the explosion, and also provide the fertile material to be neutron irradiated by neutrons which escape from the exploding slug. In addition, the atoms of the slurry act to cause many of the escaping neutrons to be reflected back into the exploding slug. Also, there will be some fissioning of fissile isotopes within the slurry. Such fissioning will produce some neutrons that will either cause further fissioning within the slurry or will enter into the exploding slug. Thus the spray systems increase the "k" of the combination of spray-slurries and slug so that it becomes more than prompt-critical and thus initiates the explosion.

After each explosion the heated slurry falls into the pool 3 which is at the upper portion of a heat exchanger system 10. The surface of the pool will rise about four meters even though the slurry is continuously being withdrawn from the heat-exchanger system 10. Molten sodium may be used as the working fluid is heat withdrawing means 12 since a leak from such means 12 into the slurry would then not be of critical consequence.

Besides serving a heat exchanger, the means 10 is also a precipitation chamber. This chamber is large enough and the velocity of flow through it is slow enough that some of the debris from the explosion will precipitate to the bottom. A sodium slurry which is rich in actinide materials flows through a conduit 14 to a precipitate processing means which will be further described herein. In practice there may be a plurality of such conduits 14 having suitable pumps and valves (now shown) associated therewith.

At the upper portion of the heat exchanger means 10 are a plurality of conduits 18. Gases and vapors from the molten slurry rise into the near void 17 and are withdrawn through these conduits 18 to vapor processing means 60 which is also described subsequently herein.

If it is assumed that the total inventory of sodium slurry is 6,000 tons and than on an average by atoms it is about 0.3% actinides, and about 0.05% miscellaneous atoms (fission products, materials worn from walls, $Mg^{24}$ from decay of neutron irradiated sodium, etc.), there will be about 180 tons of actinides within the slurry. If but 0.2% of the actinides of the spray slurry from the chamber precipitates each cycle, there will be more than enough actinide precipitate for fabrication into new slugs.

The cooled slurry, from which some of the debris has precipitated, is pumped by a plurality of pumps 15 through conduits 16 to a toroidal shaped storage means 20 which may completely surround the central portion of the chamber 2. The storage means 20 supplies the sprays 23 through the conduit 27.

The pumps 15, as well as a plurality of pumps 25, 35, and 45 are continuously operated. Pumps 25 pump slurry from conduit 16 through conduits 26 to pumps 35 and 45 and to a storage chamber 30 which may also be toroidal in shape and supplies the sprays 33 through the conduits 37. Pump 35 pumps slurry through conduits 36 to a storage chamber 40, the most vertically elevated, which supplies the sprays 43 through conduits 47. Pumps 45 pump slurry to storage chamber 50 by conduit 46. Storage chamber 50 supplies the sprays 53 through conduits 57. A plurality of storage chambers 50 may be used instead of a single storage torus.

Note that at the bottom of each of these storage chambers 20, 30, 40, 50 there is at least one conduit, respectively numbered 24, 34, 44, 54 which transport actinide rich slurry to the precipitate processing means 70. Also, at the top of each of these storage chambers there is at least one conduit, respectively numbered 28, 38, 48, 58 through which vapors and gases are transported to the vapor processing means 60. If desired, traps respectively numbered 21, 31, 41, 51 and 61 may be positioned above the storage chambers to collect either vapors that have condensed or gases that have transmutted into solids or liquids. A trap 11 in the conduit 18 and a trap 61 in conduit 68 perform similar functions. For example, traps 11 and 61 might collect significant quantities of molten sodium which condenses from sodium vapor. In all the conduits there will be gases transmutting into solids or liquids. The longer half lives of some of the inert gas isotopes that transmute into alkali metals and then into either strontium or barium are as follows: $Kr^{87}$ (78 min), $Kr^{88}$ (2.8 hr), $Kr^{89}$ (3.2 min), $Kr^{90}$ (33 sec), $Kr^{91}$ (10 sec), $Kr^{92}$ (2.4 sec), $Kr^{93}$ (2.3 sec), $Xe^{135}$ (9.2 hr), $Xe^{137}$ (3.9 min), $Xe^{138}$ (17 min), $Xe^{139}$ (41 sec), $Xe^{140}$ (16 sec), and $Xe^{141}$ (3 sec). Since the 1 mm vapor pressure of cesium is 279° C. and of rubidium is 297° C., it can be expected that traps 11, 21, 31, 41, 51, and 61 will entrain these alkali metals.

The means by which such isotopes and elements will be separated out and processed is complex but conventional and will not be described herein as outside the scope of this invention. Some actinides can be transported from the vapor processing means 60 to a slug fabricating means 90. Also some sodium therefrom may be transported to the storage chambers 50 and some purified sodium may also pass to the slug fabricating means 90. The residue, which is mostly radioactive fission products, can be either further processed or placed in storage. Similar processing and disposal may be used for the materials removed from the traps.

The conduits 14 and 24 along with similar conduits 34, 44, 54 which begin respectively at the storage areas 30, 40, 50, transport the precipitated heavy insolubles to the precipitate processing means 70 which first acts as a precipitation basin wherein the slurry is separated into molten sodium with few impurities that can be returned to the storage chamber 40 for use as spray or transported to the slug fabricating means 90 as needed.

The precipitate is then heated (the heat generated by its own radioactivity will greatly accelerate this heating) to about 600° C. where the remaining sodium and other alkali metals will be vaporized off. This heated precipitate, which is substantially free of alkali metals, is then transported to either the slug fabricating means 90 or to an actinide separating means 80 in which this precipitate is separated into a plutonium rich portion and an uranium rich portion, both of which are transported to the slug fabricating means 90, and some fission products with debris of atoms worn from the walls of the chamber's heat exchanger means and the conduits. These separation procedures are also accomplished by conventional means.

While precipitate is being processed and while the complex slug is being asembled, great care should be taken so that the configuration do not become critical.

Yet the final complex slug should have a "k" of about 0.99. There should be safety means always available to quickly correct any configuration which is too close to criticality.

Figure 2:
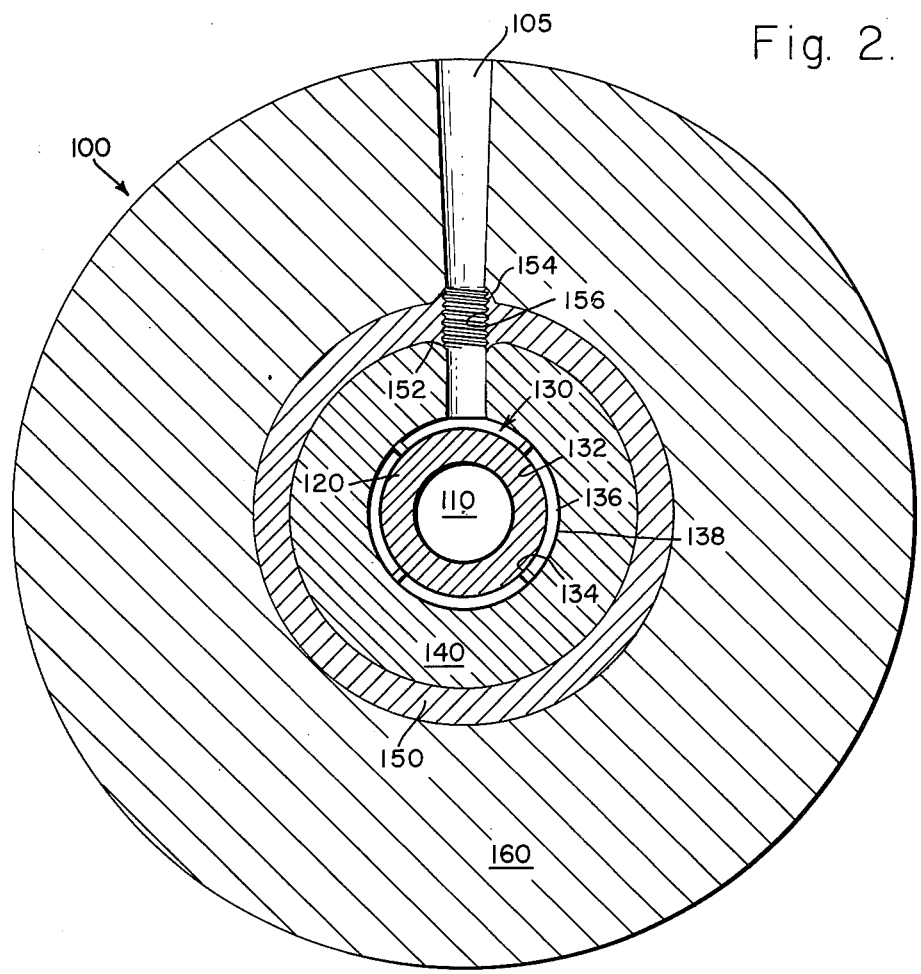
FIG. 2 is a cross-section of a blanketed nuclear explosive for use in the reactor system of FIG. 1.

FIG. 2 is a cross-section of the spherical blanketed explosive or complex slug 100 which is constructed in the slug fabrication means 90 with recycled materials from previous explosions and contains a central void 110 with a radius of about 2.8 cm. Surrounding this void is a spherical shell 120 with an outside radius of 4.4 cm. This shell 120 is of solid actinide which is about 99% plutonium.

Shell 130 which surrounds the shell 120 is about 4 mm thick and contains an inner layer 132 and an outer layer 138 both of solid sodium each about half a millimeter thick. These two layers are held in place by a plurality of supports 134. If there are twenty such supports 134, and each support is cylindrical in shape with a radius of one millimeter, these supports of solid sodium will occupy about 0.74% of volume in the layer 136 which lies between layers 132 and 138. Into this layer 136 will first be circulated cool argon gas to cool the layers 132 and 138 to a temperature of about −180° C.

Subsequently, about 10 to 30 cm$^3$ of liquid argon will be placed within layer 136. This will be sealed by rapid insertion of a bolt 170, illustrated in FIG. 3, which will be subsequently described. The time elapsed from insertion of the liquid argon within layer 136 and explosion of the slug 100 is preferably on the order of a quarter-minute.

Substantially surrounding shell 130 is layer 140 formed of precipitate which has either been pressed firmly or cast into shape and contains about 9% plutonium and about 90% uranium. This layer 140 is about 3.8 cm thick and is itself substantially surrounded by layer 150 of cast uranium alloy which is about 2.4 cm thick. The outermost layer is a shell 160 of solid sodium which is about 14 cm thick. The shell 160 could utilize solidified sodium slurry which contains some actinides.

Figure 4:
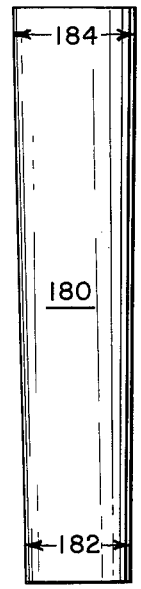
FIG. 4 is a plan view of a solid sodium bolt for the blanketed nuclear explosive of FIG. 2.

Into this half-meter diameter spherical complex slug is a tapered opening 105 which goes through layers 160, 150 and 140. At its innermost part, near layer 138, its diameter is preferably about 2 cm. When the slug is completed, a bolt 170 and a bolt 180, illustrated in FIG. 4, are inserted in the opening 105, securely sealing the shell 130.

The shell 150 could be widened by extensions 152 and 154 so that a 3 cm long portion of shell 150 comes in contact with the bolt 170. This exposed portion of shell 150 is preferably provided with threads 156 so that the bolt 170 can be locked within the shell 150. If desired, alternate means, well-developed by those skilled in such arts, may be used such as, for example, the locking means employed to close the breach of a large gun.

Figure 3:
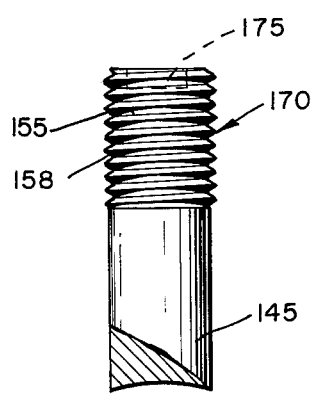
FIG. 3 is a plan view, partially cut away, of an actinide bolt used in the blanketed nuclear explosive of FIG. 2.

As shown in FIG. 3, a lower portion 145 of the bolt 170 is made of actinide material from precipitate as is shell 140 while the upper portion 155 is made of uranium alloy as is shell 150. Note that this portion 155 has means 158 with it to interlock with the threading and locking means 156 of the exposed portions of shell 150. For the means to cause the twisting needed for such locking, an indentation 175 may be provided in the top of the bolt 170. An exterior twisting tool, such as an Allen wrench, can be used to lock the bolt 170. The bolt 180 is molded of solid sodium and dimensioned for force fit in the outer portion of the opening 105.

By adding small but varied amounts of precipitate to the bolts 180, the practitioner of this invention can insure that the complex slug being assembled has a "k" below criticality but yet high enough so that the slug will explode near the designated explosion point. For example, if the "k" is slightly lower than desired when all of the complex slug 100 is assembled except for the final bolt 180, an already-fabricated bolt 180 may be used which has enough precipitate within the solid sodium that it, when placed in the opening of slug 100, brings the final configuration of the complex slug 100 to the desired value of "k." Note that the bolt 180, as shown in FIG. 4, has a diameter of about 2.1 cm on its inner portion as shown at 182, while its outermost diameter, as shown at 184, is about 2.5 cm. This bolt 180 is rapidly forced into the opening 105 of slug 100. Since sodium is soft and since the shell 160 is not needed to contain explosive forces by tensile means, the bolt 180 will be satisfactorily inserted by this method.

It should be understood that the important construction figure for the assembly is the value of "k." Such factors as thickness of the shell 120, or the isotopic concentrations in the shell 120 could be so adjusted through the use of computer calculations that this objective is obtained. It should always be kept in mind that the explosion should always be less than or at the desired containable magnitude of 80 tons (TNT equivalent) and never at a much larger magnitude.

It is an advantage of this invention that many of the actinide fissions take place in the inner tamping shell 140 wherein there is much fast neutron fissioning of $U^{238}$ since shell 140 has over ten times as many $U^{238}$ atoms as it has plutonium atoms. Also, there will be some fast neutron fissioning of $U^{238}$ in the middle tamping shell 150. Even though the fission cross-section for neutrons of 1.4–3.0 Mev is but 0.485 barns for $U^{238}$ and 1.95 barns for $Pu^{239}$, perhaps on the order of one-sixth of all the fissions will be of $U^{238}$. Also, it should be noted that there will be much fast neutron fissioning of $Pu^{240}$. For neutrons in the 1.4–3.0 Mev range, its fission cross-section is 1.54 barns while its capture cross-section is but .08 barns. Even when the neutrons are in the 0.4–0.9 Mev energy range, its fission cross-section is 0.77 barns while its capture cross-section is 0.15 barns.

A majority of the neutrons produced by fissioning within the shell 140 will travel outwardly through shell 150 and into shell 160. Many of them will be reflected back into shells 150 and 140 by collisions with atoms of sodium. Such reflected neutrons will, for the most part, be of such low energy that they will cause no fast neutron fissioning of $U^{238}$ and very little fissioning of $Pu^{240}$. However, some of the reflected neutrons will cause fissioning of $Pu^{239}$ and $Pu^{241}$ in shell 140 but many more will be captured by $U^{238}$, $Pu^{240}$, fission products, and fissile isotopes.

As the slug falls into the spray configuration which becomes denser approaching the lower portion of the chamber 2, a larger number of neutrons that have escaped outwardly from the shell 160 will be reflected back into the slug. Many of these will re-enter the shell 140 where some will cause fissile actinide fissioning.

Likewise, some of the neutrons which have escaped from the assembly into the concurring spray pattern will cause fissioning of fissile actinides within the atoms of the spray-slurry. Such fissioning will produce neutrons which will cause still more fissioning, or will be captured. A few of these new neutrons will migrate into the shell 140 and will cause fissioning there.

Note that there is a constant production of new neutrons, even when the configuration has a "k" that is less than 1.00, from delayed neutrons from fission products within the slurry and from the spontaneous fissioning of such isotopes as Pu$^{240}$. If the "$k$" with prompt-neutrons is, for example, 0.99, there will be a multiplying of about a hundred times of the total production of neutrons.

Once the slug and spray-slurry configuration has a prompt-neutron "$k$" of slightly more than 1.00, there will be a rapid build-up of fissioning. From available publications it is apparent that the generation time in an atomic bomb is on the order of 20 nanoseconds. That means that with a promptneutron "$k$" of 1.007 there is a doubling of the number of fissions per generation in about 2 microseconds. However, with the practice of this invention, the generation time is perhaps as much as a hundred times longer. That is because the neutrons being reflected back from the spray could average a life of say 200 micro-seconds (average energy of 40 ev and distance travelled of 17.6 meters) while those new neutrons from fissioning outside of the assembly could be causing fissioning within the assembly could be causing fissioning within the assembly roughly 500 microseconds later.

In an atomic bomb it is desired to increase the "$k$" as rapidly as possible so that there will not be sufficient time for a buildup of fission produced energy that will blow the bomb apart until the maximum "$k$" has been obtained. However, in the practice of this invention it is desired to have a very slow build-up of the prompt-neutron "$k$" of the complex slug and spray pattern to a value slightly more than 1.00 by having a very long average generation time. This avoids the destructive effects which are present with nuclear explosives used as bombs and permits the complex slug 100 to produce a containable peaceful explosion. Note that the slug will be falling with a velocity of about 2 cm/msec and the spray concurring at about 1 cm/msec when the explosion occurs. Calculations indicate that at such time the "$k$" is increasing at about 0.001 per millisecond.

About a millisecond after the slug-slurry becomes slightly more than prompt-critical, there will have been enough fissioning within the shell 120 that the shell is in the phase of a liquid. The shell 120 will have somewhat expanded outwardly as it was heated up. This outward expansion will have reduced the "$k$", perhaps more so than the gain in "$k$" due to further concurrence of complex slug and slurry. The shells 130 of sodium and argon will be somewhat condensed by this expansion.

For every fission per gram in layer 150 there will be about a dozen fissions per gram in layer 140 and about a hundred fissions per gram in layer 120. Also, since the melting point of layer 120 is about 640° C. while the melting point of layers 140 and 150 are about 1200° C., layer 120 will liquify hundreds of generations before layer 140, and thousands of generations before layer 150. Even though layer 140 is liquified, the still solid layer 150 will contain the pressures formed in layer 130 by heated argon gas and vaporizing sodium.

Although there could be some actinide atoms mixed with the sodium in layers 132 and 138, most of the heating of layer 130 will come from either conduction of heat from the touching portions of layers 120 and 140 or from the interception of gamma and x-rays from fissioning in layers 120 or 140.

The heat-sink capacity of the cryogenically cooled layers 132 and 138 prevents too rapid a build-up of argon vapor pressure within layer 136. Also, the need for thermal energy to vaporize argon results in an argon gas temperature of about 100° C. when the layer 120 first becomes liquified. At that instant there will be many atmospheres of pressure, which are contained by the still solid layers 140 and 150. Hence, there will be an implosion of the liquified layer 120.

Although there will be some expansion of layers 140, 150 and 160 due to heating, the "$k$" of the complex slug and slurries will tend to increase as the layer 120 is imploded. In addition to heating by conduction and photon attenuation, the atoms in layers 130 will be heated by collisions with neutrons. Thus, the layers 130 will be so heated that the contained sodium, which has a boiling point of 880° C., will be vaporized. Of course as the layer 120 is imploded, the volume of gas and vapor will be increased.

It is the purpose of the design of the complex slug of this invention to have a build-up of fission energy slow enough that there is an implosion of the liquified layer 120 and not a quick shattering-explosion which cracks both the imploding layer and the tamping layers. This is not unlike a comparison between chemical explosives which are used for blasting and chemical explosives which are slowed down so that they can be used to propel a missile.

When the temperature within layer 120 reaches about 4000° C., there will be a build-up of plutonium vapor pressure. However, at the same time there will be a further build-up of imploding pressure mostly now due to vaporizing sodium whose temperature now exceeds 1000° C.

It is important in the practice of this invention that the tamping layers are vapor or gas tight. This is especially true for the layer 150 and the portion 155 of the bolt 170. That also includes the portions of threading 156 of layer 150 and of threading 158 of the bolt 170.

Because of its high specific heat and high heat of fusion, most of the layer 160 will be solid even though the temperature at the center of the complex slug 100 is in excess of 4000° C. Even though there will be some heating of the sodium of layer 160 by attenuated photons and by collisions with neutrons, these means are not enough to melt all the sodium. Thus, the layer 160 helps layer 150 contain the explosion.

Since the heat of vaporization of sodium is about 1,000 calories per gram, the layer 160 inertically contains the explosion and keeps the "$k$" from falling too rapidly, even though layer 120 is vaporized and layer 160 itself is liquified.

The implosion of shell 120 will continue due to momentum for a few microseconds even after the centroid actinide vapor pressure surpasses the imploding pressure of sodium vapor and argon gas. Then the implosion will change to an explosion. At such time, the strength of the still somewhat solid shells 150 and 160 will be insufficient to contain these pressures. At that instant, shell 140 will be as a liquid. However, the mass of the shells 140, 150 and 160 will act to inertially confine the explosion.

Even if the "$k$" of the exploding assembly with slurry is 0.999, there will be a thousand-fold multiplication of the fissioning from a single generation. Hence, the total magnitude of the explosion can be on the order of 80 tons of TNT (within about $10^{-2}$ second) or about 335 gigajoules. An additional quantity of energy will be released by the decay of very short-lived radioactive isotopes and by the fissioning resulting from the delayed neutrons. Such an additional quantity of energy equal to about 65 gigajoules causes the total power output of thermal power with an explosion every ten seconds to be 40 gigawatts.

The operational sequences of the practice of this invention are as follows (0.00 sec is the instant of maximum explosion):

- −2.0 sec The slug 100 is released by the slug dropping means 92. The center of the slug is dropped from a point 99 therein. The trap doors 9 are open.
- −1.8 sec The valves 29 are opened and slowmoving spray 23 starts falling in the trajectory generally illustrated in FIG. 1.
- −1.4 sec The valves 39 are opened and the fast-moving spray 33 starts along its trajectory.
- −1.2 sec The trap doors 9 start closing.
- −1.15 sec The valves 59 are opened and the slow-moving spray 53 starts to follow its trajectory.
- −0.95 sec The valves 49 are opened and the very fast-moving spray 43 starts along its trajectory.
- −0.5 sec The valves 39 and 49 are closed. This cuts off the sprays 33 and 43.
- −0.1 sec The trap doors 9 are closed. The valves 29 are closed cutting off the sprays 23. The valve 69 is closed, closing the conduit 68 to the vapor processing means 60.
- −0.05 sec The slug spray configuration becomes critical.
- −0.005 sec The slug spray configuration becomes more than prompt-critical.
- 0.00 sec Maximum rate of power production of explosion.
- +0.4 sec The valves 59 are closed cutting off sprays 53.
- +2.0 sec The valves 69 are opened, opening the conduits 69 to the traps 61 and to the vapor processing means 60.
- +7.0 sec The trap doors 9 begin to be opened.
- −2.0 sec The cycle is repeated.

Note that the time for opening or closing valves is an average time for that system of valves. For example, the uppermost valves 39 could be opened at −1.5 sec and closed at −0.4 sec while the lower valves 39 could be opened at −1.3 sec and closed at −0.6 sec. Likewise, there would be similar variations in timing of the valves 29, 49, and 59.

The spray systems are so designed that within a radius of about 9 meters of the exploding slug is about 1,500 tons of spray. The average density of the volume of spray thereabout is about half of that of an all liquid slurry.

Assuming that the total inventory of actinide within the system is 300 tons, 9% of this actinide is plutonium, there is about 27 tons of plutonium. If with each cycle there is a net production of 3 grams of plutonium, the net production in one year will be 9.46 tons of plutonium (doubling time of less than 3 years). With an input of about 25.2 tons of depleted uranium per year, there will be about 15.8 tons of fission products produced.

The key to operation of the novel reactor of this invention is the fact that the criticality of a complex slug can be increased by the implosion of an inner layer containing fissile material whereby the implosion is caused by a build-up of gas and or vapor pressures. This build-up of pressure is caused by heating due to fissioning and is contained by less fissile surrounding materials which remain in the solid phase while the inner layer containing more fissile materials is in the liquid phase. In the preferred embodiment, the imploding vapors and bases include argon gas, which is in the liquid phase just prior to the explosion, and sodium vapor, which was in the solid phase.

With the practice of this invention, a single gas or vapor material, such as rubidium metal or very cryogenic helium vapor, can be used. Also, this invention may be practiced with more complex mixtures such as cryogenic helium gas, argon ice, and solid sodium. With alkali metals as the working fluid, the use of deuterium-alkali metal compounds, such as NaD, are another alternate gas and/or vapor pressure means. Deuterium is preferred to protium since deuterium has a much lower cross-section for neutron scattering and is a much poorer moderator. Also, deuterium has a much lower neutron capture cross-section. In addition, there will be some neutron doubling by the reaction:

Fast $n + D \rightarrow 2n + H$

Likewise, this invention could be practiced with the use of actinide deuterides such as $UD_3$ of $PuD_3$. Like hydrides, most actinide or alkali metal deuterides are unstable at temperatures above 300° or 400° C. Hence, when the compounds are heated up by fissioning thereabouts, they will decompose and hence cause a greater build-up of vapor and/or gas pressure.

This invention could be practiced with other fissile actinides than plutonium and with other fertile actinides than depleted uranium. For example, the fissile material could be $U^{233}$, and the fertile material thorium.

It is even possible that this invention could be practiced where there is a greater complexity of actinides used. As with the innermost layer that is imploded formed of plutonium. The layer 140 is divided into two portions. The inner portion is of uranium, a mixture of $U^{238}$, $U^{233}$, and $U^{234}$ with slight quantites of $U^{232}$, $U^{235}$, and $U^{236}$. This mixture could come from the quick processing of the irradiated actinides of the slurry. From such quick processing, by means known to those skilled in the art, there could be isolated protactinium-233, which has a half-life of about four weeks. Such protactinium-233 decays into uranium-233 which, for light water reactors, is a better additive to "enrich" uranium with than is plutonium. The outer portion could be of precipitate which would be about 3% plutonium, 14% uranium, 80% thorium, 2% other actinides, and 1% of miscellaneous atoms. The layer 150 would be of almost pure thorium which has a higher melting point than does uranium.

The input into such a reactor system would be thorium and depleted uranium while the output would be almost pure uranium-233, fission products, and traces of such actinides as protactinium-231, neptunium, americium, and curium. It is even possible that such a reactor system could be a means of "consuming" neptunium-237 because $Np^{237}$ has very good fission cross-sections to fast neutrons. Placing such neptunium in the innermost portion of layer would for the most part expose it to such fast neutrons. If a neutron is captured, resulting $Np^{238}$ decays into $Pu^{238}$, which is highly fissionable to fast neutrons and could be consumed in the inner layer of plutonium.

When bringing these reactor systems on stream, great care should be taken to keep the magnitude of explosions within the design criteria of the chamber. One way to accomplish this would be to place about 1 gram of liquid argon in the first complex slug, slowly increasing the mass of argon added to each subsequent slug until an explosion of the desired magnitude is reached.

A fizzle is of no great concern since an explosion of but one-thousandth of the desired magnitude would be enough to "atomize" the complex slug.

Other parameters such as the frequency of explosions or of the magnitude of the explosions could be altered provided that corresponding changes are made in the size of the explosion chamber, heat exchangers, pumping systems, etc.

If there is a desire to produce tritium, the shell 98 could be of solid lithium. Also, there would be some lithium dissolved in the mostly sodium slurry.

It is even possible that this invention could be practiced with compounds such as $H_2O$, $UO_2$, $PuO_2$, etc., if provision is made for removing the hundreds of tons of produced steam in the design of the chamber and reactor system. Shell 120 would then be mostly $PuO_2$, shell 130 would be helium gas and ice, shell 140 mostly $UO_2$, and shell 160 of ice.

With such a reactor system it is possible to have the vapor and/or gas pressure caused by having a mixture of liquid or solid oxygen mixed with actinide hydrides. As the layer 130 is heated up by fissioning, there would be the combustion of such actinide hydrides with oxygen producing heat energy, steam, and actinide oxides.

With such a reactor system it might be necessary to have some metallic uranium used for shell 150 and some oxygen would be added to the chamber to oxidize hydrogen or uranium.

An advantage of such a reactor system is that the separation of plutonium from uranium could be done by chemical means in water solutions wherein most of the fission products and other debris could also be easily separated out.

Alternate systems using such compounds as hydrocarbons or molten salts could also be used for the practice of this invention.

It is understood that the foregoing description is illustrative of a preferred embodiment of this invention and that the scope of the invention is not to be limited thereto but is to be determined by the appended claims.

I claim:

1. In combination:
   a chamber for containing an explosion;
   a slug means having a tamping means, a pressure forming means, and a fissile core, said pressure forming means completely surrounding said fissile core, and said tamping means completely surrounding said pressure forming means
   means for introducing said slug means into said chamber;
   means for configuring spray of a fluid medium containing return reflective materials in said chamber around said slug for increasing neutron produced fissioning in said slug means resulting in said fissile core heating said pressure forming means and inducing a change in state to vapor and/or gas therein and exploding of said slug means and means for recovering useful energy.

2. The combination of claim 1 wherein said spray configuring means includes means for protecting said chamber from said explosion.

3. The combination of claim 1 wherein said fluid medium comprises a slurry of molten alkali metal.

4. The combination of claim 3 wherein said fluid medium include fissile and fertile actinides.

5. The combination of claim 4 wherein said slurry is heated by said explosion and including means for extracting heat from said slurry.

6. The combination of claim 4 including means for extracting materials from said slurry.

7. The combination of claim 6 including means for constructing slug means using said materials.

8. The combination of claim 1 wherein said fissile core includes a central void, shell means of mostly fissile actinides surrounding said void for liquifying and imploding upon incidence of increased reflection of neutrons by said spray.

9. The combination of claim 8 wherein said slug means includes sodium layer means within said tamping means and surrounding said shell means.

10. The combination of claim 9 wherein said sodium layer means comprises first and second sodium shells containing argon therebetween.

11. The combination of claim 8 wherein said tamping means comprises a shell of uranium and plutonium.

12. The combination of claim 11 wherein said shell comprises about 90% uranium and about 9% plutonium.

13. The combination of claim 11 wherein said tamping means includes a shell of solid sodium surrounding said shell or uranium and plutonium.

14. The combination of claim 13 wherein the sodium shell of said tamping means contains actinides.

15. In a reactor for producing useful energy by exploding slug means in a chamber, the improvement comprising:
    slug means for explosion in said chamber including a central void, a first shell means of mostly fissile actinides surrounding said void, a second shell means having a pressure forming means, said second shell means surround said first shell means, and tamping means surrounding said second shell means;
    and
    spray means in said chamber for interacting with said slug means, to increase neutron-produced fissioning in said first shell heat said second shell and cause change in state to vapor and/or gas of said pressure forming means and implosion of said second shell means, and means for recovering useful energy.

16. A reactor as in claim 15 wherein said spray means comprises a slurry of molten alkali metal containing fissile and fertile actinides.

17. A reactor as in claim 16 wherein explosion of said slug means causes said slurry to be heated and collect debris, and including means for extracting heat energy from said slurry, means for extracting debris from said slurry, and means for returning said slurry to said chamber.

18. A reactor as in claim 17 including means for processing said debris into slug means constituent materials and means for constructing slug means utilizing said materials.

19. A reactor as in claim 17 wherein said slurry returning means comprises storage means for holding said slurry, pump means for propelling said slurry to said storage means, nozzle means for controlling re-entry of said slurry into said chamber, and valve means for controlling flow of said slurry from said storage means to said nozzle means.

20. A reactor as in claim 19 wherein debris extracting means includes settling means in said heat energy extracting means and in said storage means.

21. A method of producing useful energy in a chamber, said method comprising the steps of:

constructing slug means having a tamping means, a pressure forming means, and a fissile core, said pressure forming means completely surrounding said fissile core, said temping means completely surrounding said pressure forming means, for explosion upon communication with neutron reflective materials;

introducing said slug means into a chamber;

surrounding said slug means with a liquid spray of neutron reflective materials for heating said slug means through increased neutron-produced fissioning in said fissile care; and exploding said slug means by change of state to vapor and/or gas of said pressure forming means resulting from said heating, recovering useful energy.

22. The method of claim 21 wherein said neutron reflective material is a liquid and including the additional steps of:

causing said liquid to absorb energy from explosion of said slug; and withdrawing the energy from said liquid.

23. The method of claim 22 including the steps of:

withdrawing explosion debris from said liquid; and processing said debris for constructing slug means.

24. Apparatus for the production of useful energy, said apparatus comprising:

a chamber having walls of sufficient strength to contain a series of explosions;

slug means;

apparatus for introducing a plurality of slug means seriatim into said chamber, each slug comprising first shell means containing fissile actinides surrounding a substantially void central region and a second shell means including a pressure forming means, said second shell completely surrounding said first shell tamping means surrounding said second shell means; and spray means within said chamber walls for producing a predetermined configuration of liquid spray in said chamber upon introduction of each of said slug means into said chamber;

said liquid spray comprising a slurry of molten alkalai metal and fissile and fertile actinides;

said slug means having a "$k$" which is less than one prior to introduction into said chamber and increases to be greater than one within said chamber due to reflection of neutrons by, and fission-produced neutrons from, said liquid spray; and said increase in "$k$" resulting in heating and change in state of said pressure forming means to vapor and/or gas in said second shell means within said tamping means, implosion of said second shell means into said central region, and explosion of slug means, and means for recovering useful energy 25. The apparatus of claim 24 wherein each explosion releases debris and energy which is absorbed by said slurry and including:

means at a lower portion of said chamber for collecting said slurry and debris;

means for extracting heat energy from said slurry; and means for recycling said slurry to said spray means for re-entry into said chamber.

26. The apparatus of claim 25 including means for extracting debris from said slurry from construction of additional slug means.

* * * * *